United States Patent Office 3,642,790
Patented Feb. 15, 1972

3,642,790
PROCESS FOR PREPARING 1,1'-DISUBSTITUTED-1,1'-DIHYDRO-BIPYRIDYLS
John Francis Cairns, Runcorn, England, assignor to Imperial Chemical Industries Limited, London, England
No Drawing. Filed Mar. 20, 1969, Ser. No. 809,045
Claims priority, application Great Britain, Apr. 2, 1968, 15,785/68
Int. Cl. C07d 31/42
U.S. Cl. 260—247.2 A         20 Claims

ABSTRACT OF THE DISCLOSURE

A process for the production of a 1,1'-disubstituted-1,1'-dihydro-bipyridyl which comprises reacting the corresponding 1,1'-disubstituted-4,4'-(or 2,2'-) tetrahydrobipyridyl with sulphur or an organic compound containing at least one —S—S— linkage.

---

This invention relates to the production of 1,1'-disubstituted bipyridylium salts and related compounds and particularly to a process for converting 1,1'-disubstituted-tetrahydro-bipyridyls to 1,1'-disubstituted-1,1'-dihydrobipyridyls which can be oxidised to 1,1'-disubstituted bipyridylium salts.

In U.K. patent specification No. 1,073,081 there are described processes whereby N,N'-(or 1,1'-)-disubstituted tetrahydro-4,4'-dipyridyls may be oxidised to N,N'-disubstituted-4,4'-bipyridylium salts using organic oxidants, especially quinones. In U.K. patent specification No. 1,077,366 there is described a process for converting N,N'-(or 1,1'-) - disubstituted tetrahydro-4,4'-bipyridyls to bipyridylium salts by treatment with one or more carbon compounds each of which contains a labile halogen (excluding fluorine) atom.

We have now found that N,N'-(or 1,1'-)-disubstituted tetrahydro-4,4'-(or 2,2'-) bipyridyls can be ocnverted in good yields into 1,1'-disubstituted-1,1'-dihydro bipyridyls which can be oxidised to the corresponding 1,1'-disubstituted bipyridylium salts.

According to the present invention we provide a process for the production of a 1,1'-disubstituted -1,1'-dihydro-bipyridyl which comprises reacting the corresponding 1,1'-disubstituted-4,4'-(or 2,2'-)-tetrahydrobipyridyl with sulphur or an organic compound containing at least one —S—S— linkage.

Organic compounds having at least one —S—S— linkage are hereinafter for simplicity referred to as organic disulphides.

The 1,1'-disubstituted-1,1'-dihydro-2,2'-bipyridyls, and the 1,1'-disubstituted-1,1'-dihydro-4,4'-bipyridyls are novel compounds.

According to a further feature of the invention, therefore, we provide, as novel compounds, the 1,1'-disubstituted-1,1'-dihydro-2,2'-bipyridyls.

According to a still further feature of the invention we provide, as novel compounds, the 1,1'-disubstituted-1,1'-dihydro-4,4'-bipyridyls.

1,1'-disubstituted-1,1'-dihydro-2,2'-bipyridyls are believed to have the basic structural formula:

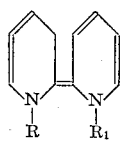

wherein R and $R_1$ each represents a hydrocarbon or a substituted hydrocarbon radical, especially an alkyl group or a carbamido-alkyl group, or wherein R and $R_1$ when taken together represent a divalent organic radical, especially an alkene group. Other 1,1' - disubstituted - 1,1' - dihydro-2,2'-bipyridyls are those having the above basic formula but containing one or more substituents, for example alkyl groups on the carbons of the pyridyl nuclei.

1,1'-disubstituted-1,1'-dihydro-4,4'-bipyridyls are believed to have the basic structural formula:

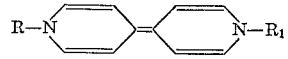

wherein R and $R_1$ are as defined above in respect of separate groups, and other 1,1'-disubstituted-1,1'-dihydro-4,4'-bipyridyls are those containing one or more substituents, for example alkyl groups on the carbon atoms of the pyridyl nuclei.

Tetrahydro-4,4'-bipyridyls which may be converted to dihydro-bihyridyls by the process include those more fully described in U.K. patent specification No. 1,073,081, and may be for example tetrahydro-4,4'-bipyridyls which carry hydrocarbon or substituted hydrocarbon radicals, especially alkyl, or carbamylalkyl, and particularly methyl or 1,1-disubstituted carbamylmethyl substituents on the nitrogen atoms. Other suitable 1,1'-disubstituted-tetrahydro-4,4'-bipyridyls are those carrying inert substituents, for example alkyl groups, on the carbon atoms of the pyridine nuclei. Tetrahydro-2,2'-bipyridyls may also be employed in the process of our invention wherein the substituents are as defined above in respect of dihydro-2,2'-bipyridyls.

The organic disulphide can be represented by the general formula $R_2$—S—S—$R_3$ wherein $R_2$ and $R_3$ may be the same or different and each represents an organic radical. $R_2$ and $R_3$ can be any organic group which is unreactive towards the reaction medium, and examples of groups which $R_2$ and $R_3$ may represent are alkyl groups, aryl groups, cycloaliphatic groups, alkaryl groups and aralkyl groups. The groups may contain one or more substituents attached to a chain or ring of carbon atoms, for example halogen atoms, nitro groups, amido groups, and amino groups or they may contain hetero-atoms, for example oxygen or sulphur atoms. We have found that particularly suitable groups which $R_2$ and $R_3$ can represent are aromatic groups, especially phenyl groups substituted by one or more nitro or amino groups; in particular phenyl groups containing a substituent, especially a nitro or amino group in the 2-position in the phenyl ring.

The organic disulphide $R_2$—S—S—$R_3$ is reduced during the reaction with the tetrahydrobipyridyl to the corresponding mercaptans.

These mercaptans $R_2$—SH and $R_3$—SH are readily oxidised back to the disulphide $R_2$—S—S—$R_3$, for example by means of oxygen or air, air/alkali, iodine/alkali, dilute nitric acid, ferric chloride or ferricyanide. The regenerated disulphide can then be used for treatment of a further amount of the tetrahydrobipyridyl.

The tetrahydrobipyridyl and the sulphur or the organic disulphide can be interacted simply by mixing them but it is preferred to carry out the reaction in the presence of an inert solvent, preferably an organic solvent. Examples of suitable solvents are carbon disulphide; ethers and thioethers, for example diethyl ether, tetrahydrofuran, 1,2-dimethoxyethane, bis-(2-methoxyethyl) ether, 1,4-dioxane and thiophene; ketones, for example acetone; hydrocarbons, for example benzene, toluene, xylene and hexane; organic bases, for example pyridine; inert halogenated hydrocarbons and particularly chlorinated hydrocarbons, for example chlorobenzene, chloroform and methylene dichloride; amides, particularly tertiary alkylamides, for example dimethyl formamide; sulphoxides, for example dimethyl sulphoxide; sulphones, for example sulpholane; and nitriles, for example acetonitrile. Mixtures of solvents may be used, for example the sulphur or organic disulphide may be employed in the form of a solution or suspension in one solvent and the tetrahydrobipyridyl may be employed in the form of a solution in a different solvent. We prefer to use a solvent or mixture of solvents which is immiscible with water since this assists recovery of the product by phase-separation.

The concentration of the tetrahydrobipyridyl may be conveniently from 0.05 to 0.15 mole per litre and the concentration of the sulphur or the organic disulphide may be from 0.1 to 10 gms. per 100 mls. of the reaction mixture. If the reagents are used in high concentration care should be taken that the reaction does not become too vigorous and lead to some destruction of the desired product or to the production of unwanted byproducts. In the case where an organic disulphide is used we prefer to employ a molar excess of the disulphide over the theoretical 1 mole required, and especially we prefer to employ a molar ratio of organic disulphide to tetrahydrobipyridyl of at least 2:1, especially at least 3:1.

The temperature at which the reaction is carried out will depend on the concentration of the reagents and on the particular reagents and solvent used. We have found that suitable temperatures are from −50° C. to 200° C., preferably from 0° C. to 150° C.; room temperature can be conveniently used. Temperatures higher than 200° C. tend to cause decomposition of the tetrahydrobipyridyl and at temperatures below 0° C. the rate of reaction is very slow. The most suitable time of reaction can be found by simple experiment and depends upon the reagents used and the temperature at which the reaction is carried out; we have however found that a minimum time of 20 to 30 minutes is generally necessary in order to obtain optimum yields. At temperatures below ambient temperatures long periods, for example 2 days, may be required in order to obtain optimum yields.

The 1,1'-disubstituted-1,1'-dihydro-bipyridyls can be converted by oxidation into 1,1'-disubstituted-bipyridylium salts which are useful herbicides. Oxidation can conveniently be effected by means of air or oxygen under acidic or neutral conditions, but any oxidising agent may be used which has a redox potential more positive than −0.50 volt in water as compared with a saturated calomel electrode as is described in co-pending patent applications Nos. 47,793/68 and 61,011/68. Examples of oxidising agents which may be used are silver nitrate, iodine, ceric sulphate and air/$CO_2$. Since the dihydrobipyridyls are easily oxidised by air, they should preferably be prepared under an inert atmosphere, for example an atmosphere of nitrogen.

The dihydrobipyridyls are very reactive compounds and since they are sensitive to oxidation on contact with air, they are not usually isolated. 1,1'-dimethyl-1,1'-dihydro-4,4'-bipyridyl has, however, been submitted to spectroscopic analysis in solution in hydrocarbons, for example benzene and cyclohexane; dilute solutions are coloured orange and concentrated solutions are coloured dark brown. The infra-red spectrum of the 1,1'-dimethyl-1,1'-dihydro-4,4'-bipyridyl in benzene shows strong absorptions at 1650 and 1700 wave numbers, and other bands at 1400, 1340 and 1210 wave numbers. The ultraviolet absorption spectrum in cyclohexene shows absorption maxima at 250, 358 and 400μ. The proton magnetic resonance spectrum in benzene shows absorptions at 1.61 and 1.83 p.p.m. (doublets—coupling constant 7 c.p.s.) which may be attributed to the ring protons, and at 5.0 p.p.m. which may be attributed to the $CH_3$—N group. Chemical shifts are relative to benzene which was used as internal standard.

The 1,1'-disubstituted bipyridylium salt resulting from oxidation of the dihydrobipyridyl may be recovered from the reaction mixture by conventional processes, for example by extraction of the reaction mixture with water or with a dilute aqueous solution of an acid such as sulphuric, hydrochloric, phosphoric or acetic acid. The bipyridylium salt may then be recovered from the aqueous phase, which has previously been separated from the organic phase, by evaporation of the water and crystallisation of the salt.

The invention is illustrated but in no way limited by the following examples.

EXAMPLE 1

1,1'-dimethyl - 1,1',4,4' - tetrahydro-4,4'-bipyridyl was prepared by reacting 60 mls. of a solution of methyl pyridinium chloride in water (2.754 moles/1) with 100 mls. of sodium amalgam (0.4% w./w.) under an atmosphere of nitrogen. The product was dissolved in 200 mls. of petrol (B.Pt. 60–80° C.).

2 mls. of this solution of the tetrahydrobipyridyl were added dropwise over a period of 15 minutes to 50 mls. of carbon disulphide containing 3.0 gms. of flowers of sulphur maintained under an atmosphere of nitrogen. The mixture was stirred for 2 days at ambient temperature and then the temperature was raised to 46° C. for 3 hours. The mixture was then cooled and poured into dilute hydrochloric acid (150 mls.) under nitrogen. Air was blown through the mixture which was then filtered to remove sulphur. Colorimetric analysis of the solution indicated 104 mgms. of 1,1'-dimethyl-4,4'-bipyridylium dichloride, representing an efficiency of 49% based on the methyl pyridinium chloride starting material.

EXAMPLE 2

A solution of sulphur (0.66 gm.) in thiophene (25 mls.) was added dropwise over a period of 15 minutes to 5 mls. of a solution in petrol of 1,1'-dimethyl-1,1',4,4'-tetrahydro-4,4'-bipyridyl prepared as in Example 1 and under an atmosphere of nitrogen. The mixture was stirred for 18 hours at ambient temperature and was then poured into dilute hydrochloric acid (150 mls.) under nitrogen. Air was blown through the mixture which was then filtered to remove sulphur. Colorimetric analysis indicated 250 mgms. of 1,1'-dimethyl-4,4'-bipyridylium dichloride, representing an efficiency of 47% based on the methyl pyridinium chloride starting material.

EXAMPLE 3

25 mls. of a saturated solution of sulphur in pyridine were added dropwise over a period of 15 minutes to a mixture of 10 mls. of pyridine and 10 mls. of a solution of 1,1'-dimethyl-1,1',4,4'-tetrahydro-4,4'-bipyridyl in toluene (prepared as in Example 1 but using toluene instead of petrol to dissolve the product) under an atmosphere of nitrogen. The mixture was stirred at ambient temperature for 2 hours, then poured into dilute hydrochloric acid (150 mls.) under nitrogen. Air was blown through the mixture which was then filtered to remove sulphur. Colorimetric analysis of the final solution indicated a yield of 414 mgms. of 1,1'-dimethyl-4,4'-bipyridylium dichloride, representing an efficiency of 39% based on the methyl pyridinium chloride starting material.

EXAMPLE 4

For purposes of comparison, Example 2 was repeated except that sulphur was excluded from the reaction mixture. The reaction efficiency was 2% based on the methyl pyridinium chloride starting material.

EXAMPLE 5

Ethylene bis-pyridinium bromide (2.1271 gms. in 10 mls. water) was added dropwise over a period of about 30 minutes to a stirred mixture of sodium amalgam (10 mls. containing 0.45% sodium) and cyclohexane (60 mls.) under an atmosphere of nitrogen. The resulting solution of 1,1'-ethylene-1,1',2,2'-tetrahydro-2,2'-bipyridyl was filtered and to it was added carbon disulphide (20 mls.) containing sulphur (2.5 gms.).

The mixture was stirred at 46° C. for 18 hours after which time it was cooled to ambient temperature and poured into dilute acetic acid (150 mls.) under nitrogen. Air was blown through the mixture after which it was filtered to remove sulphur. Spectroscopic (ultra-violet) analysis of the final solution indicated a yield of 206. mgms. of 1,1'-ethylene-2,2'-bipyridylium ion, representing an efficiency of 18% based on the ethylene bis-pyridinium bromide starting material.

EXAMPLE 6

A solution of 1,1'-ethylene-1,1',2,2'-tetrahydro-2,2'-bipyridyl in toluene was prepared by the procedure of Example 5 but using toluene instead of cyclohexane as solvent. A portion (10 mls.) of this solution was added to 20 mls. of a saturated solution of sulphur in xylene, and stirred at 20° C. under an atmosphere of nitrogen for 18 hours. The solution was then poured into dilute hydrochloric acid (50 mls.) and air was blown through the mixture. The mixture was filtered to remove sulphur. Spectroscopic (ultra-violet) analysis of the final aqueous solution indicated a yield of 49 mgms. of 1,1'-ethylene-2,2'-bipyridylium dichloride, representing an efficiency of 23% based on the ethylene bis-pyridinium bromide starting material.

EXAMPLES 7-16

These examples illustrate the preparation of 1,1'-dimethyl-4,4'-bipyridylium diacetate from 1,1'-dimethyl-1,1',4,4'-tetrahydro-4,4'-bipyridyl.

The experimental procedure carried out in each example was as follows:

All reagents and the toluene were purged with nitrogen for 30 minutes before use. The particular reagent used in each example is shown in the table below.

A solution of 1,1'-dimethyl-1,1',4,4'-tetrahydro-4,4'-bipyridyl is toluene was added to a stirred solution or suspension of the disulphide in toluene under an atmosphere of nitrogen at 20° C. in an amount such that the molar ratio of disulphide:tetrahydrobipyridyl in the resulting mixture was approximately 1.5:1 (except in Example 8 where the ratio was increased to 3:1). The mixture was stirred continuously overnight at 20° C. and was then poured into dilute acetic acid (ca. 0.4 mole/litre). Air was then blown through the acidified mixture at the rate of 100 mls. per minute for 1 hour.

The resulting mixture contained 1,1'-dimethyl-4,4'-bipyridylium diacetate. The amount of this salt was determined colorimetrically and from the result the reaction efficiency was calculated. The tetrahydrobipyridyl starting material was obtained by reductive coupling of methyl pyridinium chloride. The reaction efficiency was calculated as a percentage based on the methyl pyridinium chloride fed.

| Example No. | Disulphide | Time (hours) | Reaction efficiency (percent) |
|---|---|---|---|
| 7 | Bis (o-nitrophenyl) disulphide | 20 | 28 |
| 8 | As 1 but molar ratio 3:1 | 20 | 55 |
| 9 | Bis (m-nitrophenyl) disulphide | 20 | 11 |
| 10 | Bis (p-nitrophenyl) disulphide | 20 | 10 |
| 11 | Bis (2,4-dinitrophenyl) disulphide | 16 | 7 |
| 12 | Bis (2-nitro-4-chlorophenyl) disulphide | 17 | 13 |
| 13 | Bis (2-aminophenyl) disulphide | 17 | 22 |
| 14 | Bis (4-aminophenyl) disulphide | 17 | 4 |
| 15 | Bis (2-methyl-5-aminophenyl) disulphide | 17 | 28 |
| 16 | Bis (4-acetylaminophenyl) disulphide | 17 | 5 |

EXAMPLE 17

1,1'-dimethyl-1,1',4,4'-tetrahydro-4,4'-bipyridyl was added with stirring at 20° C. to dimethyl disulphide ($CH_3$—S—S—$CH_3$) under an atmosphere of nitrogen in an amount such that the molar ratio of disulphide:tetrahydrobipyridyl was approximately 1.5:1. Both reagents had previously been purged with nitrogen gas for 30 minutes. The mixture was stirred for 20 hours at 20° C., the nitrogen atmosphere being maintained throughout. The mixture was then poured into dilute acetic acid (ca. 0.4 mole/litre) and air was bubbled through the resulting mixture at the rate of 100 mls./minute for 1 hour. The product was 1,1'-dimethyl-4,4'-bipyridylium diacetate and the reaction efficiency was 10% based on the tetrahydrobipyridyl fed.

What I claim is:

1. A process for the production of a 1,1'-disubstituted-1,1'-dihydro-bipyridyl which consists of reacting the corresponding 1,1'-disubstituted tetrahydrobipyridyl selected from the group consisting of:

1,1'-disubstituted-tetrahydro-4,4'-bipyridyls wherein the 1,1'-substituents are selected from the group consisting of lower alkyl and carbamidoalkyl of the formula —$CH_2CONR_2R_3$ wherein $R_2$ and $R_3$ are lower alkyl or wherein $NR_2R_3$ is morpholino or piperidino; and 1,1'-disubstituted-tetrahydro-2,2'-bipyridyls wherein the 1,1'-substituents are selected from the group consisting of lower alkyl or when taken together ethylene, with sulphur or an organic disulphide of the formula $R_4$—S—S—$R_5$ wherein $R_4$ and $R_5$ are organic radicals selected from the group consisting of lower-alkyl unsubstituted, or substituted by phenyl, chloro, amino, amido and nitro, and phenyl unsubstituted, or substituted by chloro, amino, amido, nitro and lower-alkyl which are unreactive towards the reaction medium.

2. A process as claimed in claim 1 wherein the reaction is carried out in the presence of an inert solvent.

3. A process as claimed in claim 1 wherein an inert organic solvent is employed.

4. A process as claimed in claim 1 wherein the reaction is carried out at a temperature of from —50° C. to +200° C.

5. A process as claimed in claim 1 wherein the temperature is from 0° C. to 150° C.

6. A process as claimed in claim 1 wherein the reaction is carried out under an inert atmosphere.

7. A process as claimed in claim 1 wherein the reaction is carried out in the presence of an inert solvent and the concentration of the tetrahydrobipyridyl is from 0.05 to 0.15 mole per litre.

8. A process as claimed in claim 1 wherein the concentration of the sulphur or the organic disulphide is from 0.1 to 10 grams per 100 mls. of the reaction mixture.

9. A process as claimed in claim 1 wherein there is employed a molar excess of the organic disulphide.

10. A process as claimed in claim 1 wherein the molar ratio of the organic disulphide to the tetrahydrobipyridyl is at least 2:1.

11. A process as claimed in claim 1 wherein the molar ratio of the organic disulphide to the tetrahydrobipyridyl is at least 3:1.

12. A process as claimed in claim 1 wherein the dihydrobipyridyl is subsequently oxidized to the corresponding 1,1'-disubstituted bipyridylium salt.

13. A process as claimed in claim 1 wherein the dihydrobipyridyl is oxidised without being first isolated from the reaction mixture.

14. A process as claimed in claim 1 wherein the organic disulphide is recovered for re-use.

15. A process as claimed in claim 1 wherein $R_2$ and $R_3$ are phenyl groups.

16. A process as claimed in claim 1 wherein the phenyl group is an amino-substituted phenyl group.

17. A process as claimed in claim 1 wherein the phenyl group is a nitro-substituted phenyl group.

18. A process as claimed in claim 1 wherein the phenyl groups are substituted with an amino group or a nitro group in the 2-position of the phenyl nucleus.

19. A 1,1'-disubstituted-1,1'-dihydro-2,2'-bipyridyl wherein the 1,1'-substituents are selected from the group consisting of lower alkyl and, when taken together, ethylene.

20. A 1,1'-disubstituted-1,1'-dihydro - 4,4' - bipyridyl wherein the 1,1'-substituents are selected from the group consisting of lower alkyl and carbamidoalkyl of the formula —$CH_2CONR_2R_3$ wherein $R_2$ and $R_3$ are lower alkyl or wherein $NR_2R_3$ is morpholino or piperidino.

References Cited

UNITED STATES PATENTS

| | | | |
|---|---|---|---|
| 3,202,500 | 8/1965 | Homer | 71—25 |
| 3,336,325 | 8/1967 | Downes | 260—296 X |
| 3,405,135 | 10/1968 | Colchester et al. | 260—296 |

OTHER REFERENCES

Raphael et al., Advances in Organic Chemistry, Methods and Results, vol. 5 Interscience, pp. 5–7, 1965.

ALAN L. ROTMAN, Primary Examiner

U.S. Cl. X.R.

260—268 TR, 294 A, 295 AM, 296 D, 296 T